Nov. 25, 1952     P. R. McEACHRAN     2,619,013
APPARATUS FOR RECONDITIONING ROAD-SURFACING MATERIALS
Filed Oct. 1, 1946     4 Sheets—Sheet 1
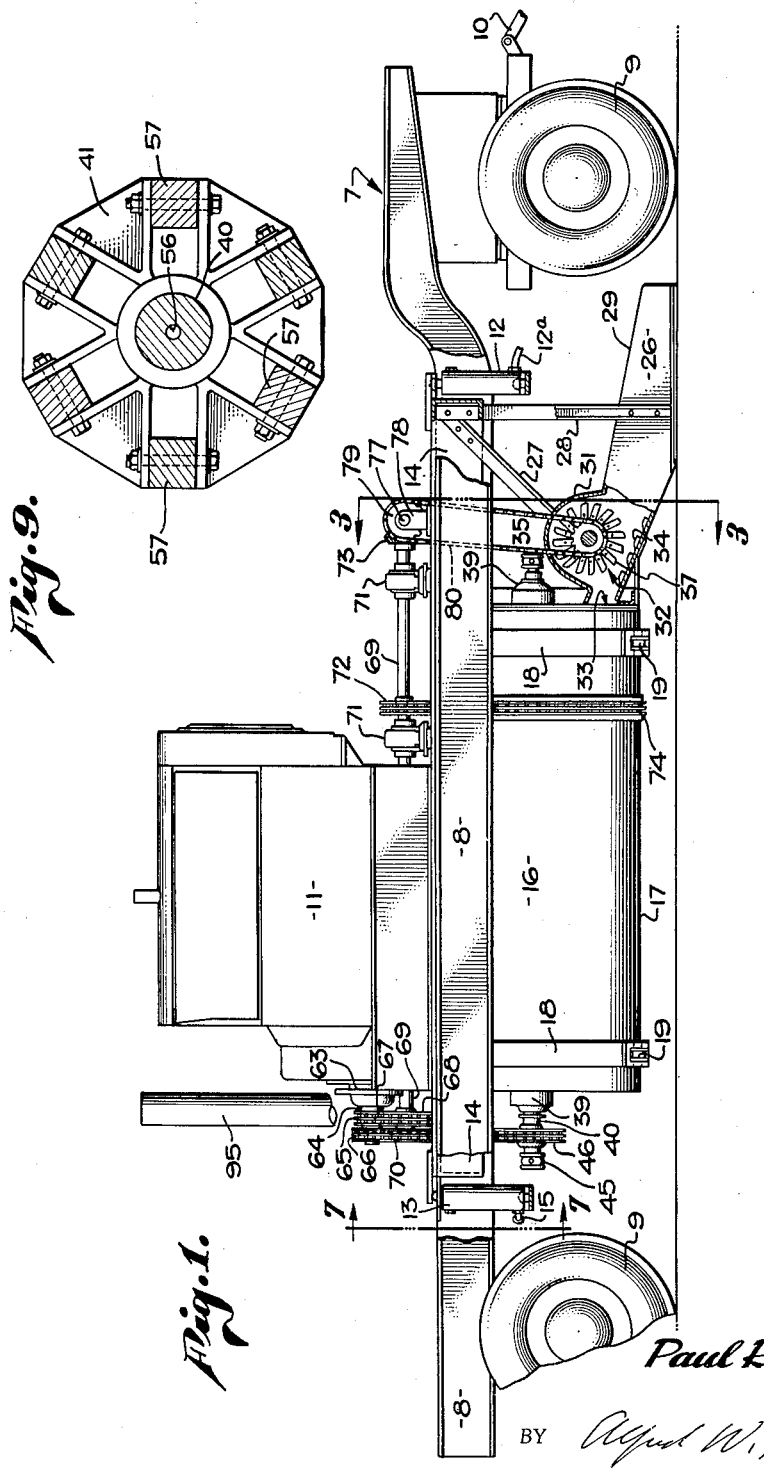
Paul R. McEachran
INVENTOR.
BY Alfred W. Knight
ATTORNEY.

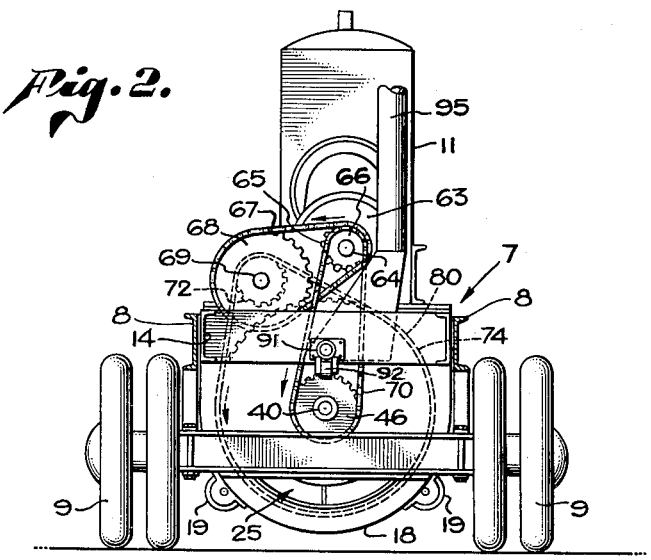

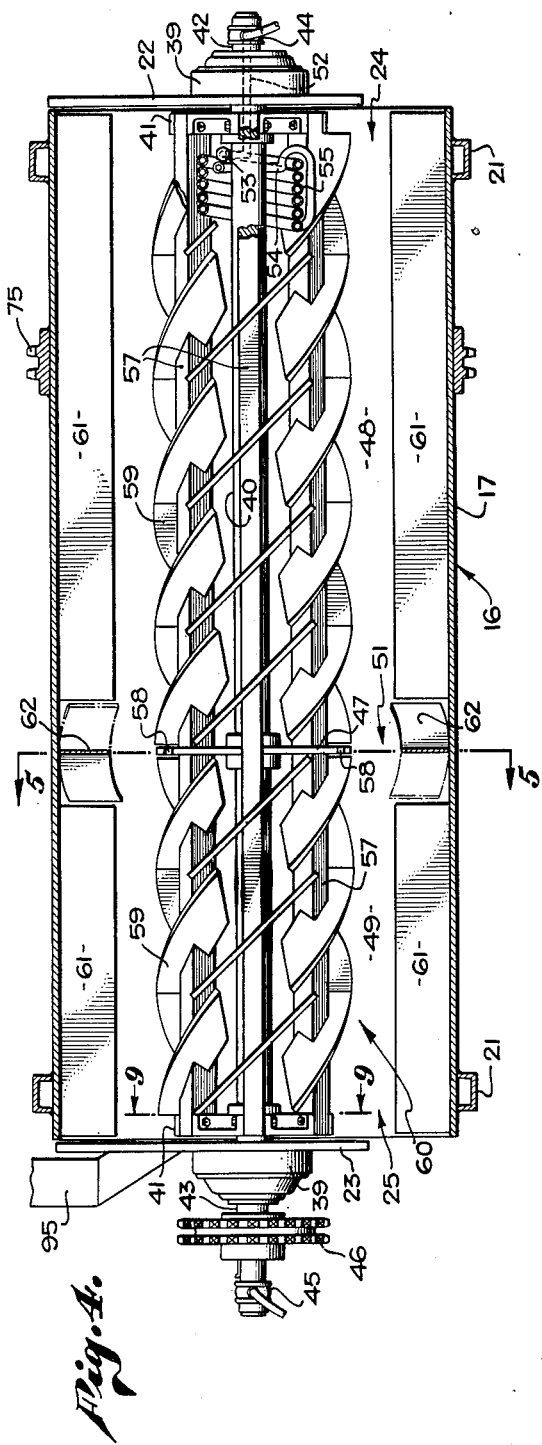
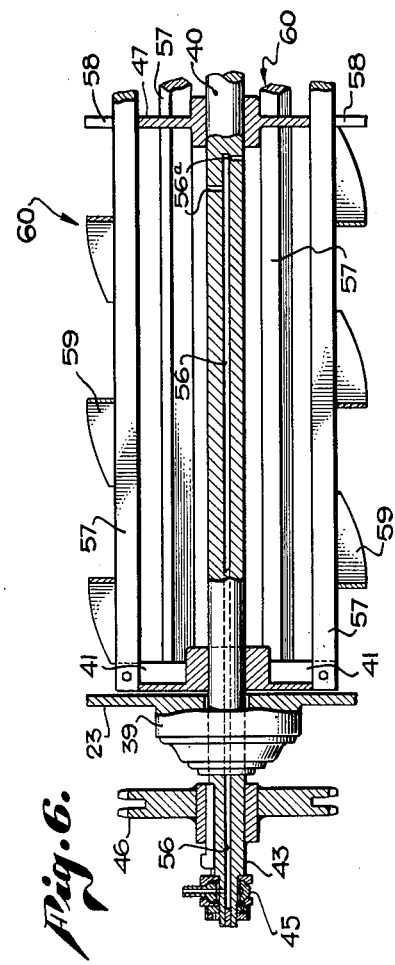

Nov. 25, 1952 — P. R. McEACHRAN — 2,619,013
APPARATUS FOR RECONDITIONING ROAD-SURFACING MATERIALS
Filed Oct. 1, 1946 — 4 Sheets-Sheet 4

Paul R. McEachran
INVENTOR.
BY Alfred W. Knight
ATTORNEY.

Patented Nov. 25, 1952

2,619,013

UNITED STATES PATENT OFFICE 2,619,013

APPARATUS FOR RECONDITIONING ROAD-SURFACING MATERIALS

Paul R. McEachran, Downey, Calif., assignor of fifty per cent to Harold R. Pauley, Los Angeles, Calif.

Application October 1, 1946, Serial No. 700,554

13 Claims. (Cl. 94—42)

My invention relates to mixing machines for the preparation and re-conditioning of road-surfacing materials and more particularly relates to vehicular machines adapted to pick up, disintegrate, mix, and re-deposit coarsely broken road-surfacing materials while being propelled or drawn along a roadway.

When a road is to be re-surfaced it is customary to break the old surface by spiked rollers or the like and to scrape the fragments into piles or windrows for convenience in loading into trucks for disposal or for transportation to a reworking point. As the means which scarify the old road surface are not intended to crush the surfacing material but rather to puncture it and crack it to an extent permitting the scraping machines to lift and gather it, a great part of the windrowed material is usually in chunks and slabs unsuited for re-working unless more finely broken up or disintegrated as a preliminary step. Frequently the amount of handling involved in loading and transporting the material to a crushing machine and then to a mixing machine and to a point where it may be worked into the road surface again is not economical, both as a matter of labor cost and as a matter of investment in heavy machinery and trucks, and the coarse material is consequently often dumped at the nearest suitable point where it represents an economic loss. Asphaltic aggregate, for example, which is to be re-conditioned by mixing with fresh materials, must be in a melted or softened state when so mixed. If fed to a heating chamber in coarse chunks, it requires a longer time to melt or soften as well as more fuel, thereby reducing the work capacity of the chamber. The mix must also be hot when returned to the road surface; therefore to avoid double heating it must be heated and mixed in a machine at the work site. If disintegrated in a separate machine, double or triple handling will be involved even if the separate machine is so close to the work site as to minimize transportation.

In view of the foregoing it is a particular object of this invention to provide a vehicular machine which will, as it travels over the road, pick up coarse aggregate or similar friable materials, crush the aggregate to sizes suitable for re-mixing, or if required, for quick melting or softening, mix the crushed aggregate with fresh materials and return the mix to the road surface, with a minimum of labor and attendance.

It is a further object of my invention to provide a machine having a mixing chamber in which old asphaltic or bituminous aggregate may be mixed with new materials, a heating chamber in which the aggregate may be softened and disintegrated as a preliminary to mixing, and crushing machinery in which the aggregate may be preliminarily reduced to sizes suitable for maintaining the work potential of the heating and mixing chambers at a high level.

A further object of the invention is to provide a machine adapted to being moved along the windrows of old surfacing material arranged ahead of it by trucks or scrapers and capable of picking up the material so presented, crushing it, heating or drying it as may be required, mixing it with water or with asphalt or road-oil binding, and redepositing it upon the road in a continuous operation.

Still another object of my invention is to provide a machine of the character described in which the material is moved from crusher to heating chamber to mixing chamber with a minimum of time in transit between these processing stages and a maximum of time for processing in each of the chambers.

A further object is to provide an apparatus of the character described, provided with a primary crushing or disintegrating member positioned to receive the road-surfacing material to be re-conditioned, subject the same to disintegratory action to reduce the same to a fragmentary condition, and a secondary disintegrating member adapted to receive the fragmented material and subject it to further disintegration in a heated zone to cause separation of the thermoplastic and rigid constituents of the material as a result of progressive disintegrating impact under conditions such as to soften the thermoplastic constituents.

A further object is to provide an apparatus of the above type, in which the primary disintegrating member is located in advance of the secondary disintegrating member, in position to forcibly deliver the fragmentary material into the secondary disintegrator.

Further objects and advantages of my invention will become apparent from consideration of the following detailed description in connection with the accompanying illustrations in which:

Fig. 1 is a side elevational partly broken-away view of an embodiment of my invention;

Fig. 2 is a rear elevational view of the machine shown in Fig. 1 with the rear frame structure broken away;

Fig. 3 is a transverse cross-section as viewed on line 3—3 of Fig. 1;

Fig. 4 is a side elevational view, on an enlarged scale, of the disintegrating drum or barrel portion of my invention, with the barrel wall shown broken away to disclose the internal mechanism;

Fig. 6 is a fragmentary longitudinal section of the rearward portion of the beater shaft and the attachments thereto, as viewed on line 6—6 of Fig. 5;

Fig. 9 is a transverse sectional detail as taken on line 9—9 in Fig. 4.

Figure 7:
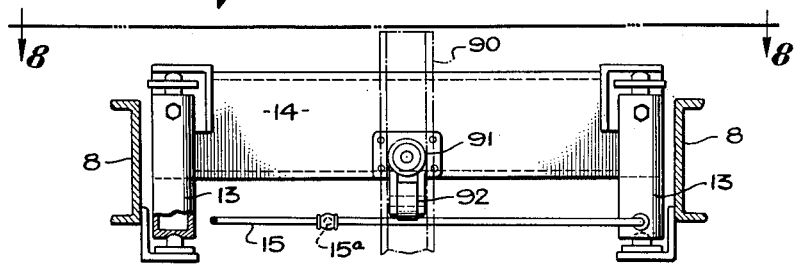
Fig. 7 is a fragmentary elevational view of the rearward portion of the structure, as taken on line 7—7 in Fig. 1.
Figure 8:
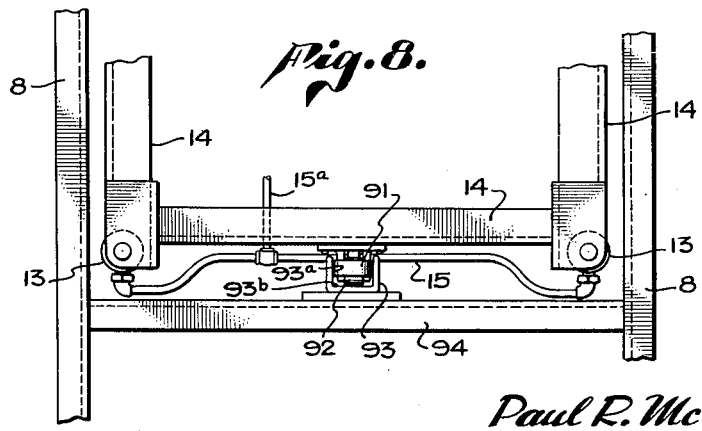
Fig. 8 is a fragmentary plan view as taken on line 8—8 of Fig. 7.

Referring now to the drawings in detail, my invention may comprise a vehicle 7 with a frame 8 mounted on a suitable supporting structure such as, for example wheels 9, and provided with a trailer hitch 10 for attachment to a truck or tractor, although, as the vehicle supports an engine 11, it might be made self-propelling. The frame 8 is provided with hoisting and leveling mechanism, preferably of the hydraulic type comprising two forward cylinders 12 and two rearward cylinders 13 upon which is supported an inner frame 14. The two forward cylinders 12 are preferably operable independently of each other as through independent pressure supply lines, as at 12a so that they may either lift or lower the forward end of the frame 14 or may tilt it to either side; and the rearward cylinders 13 are operable as a unit and are connected by a conduit 15 connected to a pressure supply line 15a (see Figs. 7 and 8) so that they may either lift or lower the rearward end of the frame 14 or may respond permissively to a tilting stress imposed through differential action of the forward cylinders, the pressure in the rearward cylinders being equalized through the conduit 15.

The inner frame 14 supports the engine 11 and also has suspended from it a disintegrating drum or barrel 16. The cylinder 17 of the barrel 16 is supported by straps 18 carried by the frame 14 and provided with rollers 19 which bear against bands 21 (Fig. 4) secured circumferentially to the cylinder 17, so that the cylinder is rotatably supported. The forward end wall 22 and rearward end wall 23 of the barrel 16 are secured to the inner frame 14 and do not rotate with the cylinder. The forward end wall 22 terminates short of the bottom of the cylinder 17 to provide an opening 24 giving entry to the lower portion of the cylinder 17 and the rearward end wall 23 is cut away so as to expose the lower segment of the cylinder 17 and thus to afford an opening 25 to that end of the cylinder.

A scoop 26, supported from the inner frame 14 by braces 27 and 28, has a lower forward flared portion 29 adapted to gather up materials from the surface of a road along which the vehicle is moved, a semi-cylindrical housing portion 31 in which is housed a crusher 32 and an enclosed passage portion 33 connecting with the opening 24 in the forward end wall 22. The crusher 32 has a set of teeth 34 fixed in the lower wall or floor of the housing 31, adjacent the passage 33, and a shaft 35 carrying a plurality of hardened teeth 37, the teeth 34 and the teeth 37 being so spaced that the latter may pass between the teeth 34. The shaft 35 is supported by brackets 38 secured to the braces 28.

Mounted centrally and longitudinally within the cylinder 17, and supported in suitable bearings 39 on the end walls 22 and 23 is a shaft 40. The ends 42 and 43 of the shaft 40 are tubular and extend outwardly through the bearings 39 and are respectively fitted at their outer ends with stuffing boxes 44 and 45 adapted to receive the ends of pipes (not shown) and to form rotatable connections therewith. The rearward end 43 is also fitted with a drive sprocket 46. Within the cylinder 17 is a baffle or partition 47, carried by the shaft 40 and dividing the interior of the disintegrating drum or barrel 16 into a forward chamber 48 and a rearward chamber 49, an annular space 51 being left between the baffle 47 and the cylinder 17 to provide a passage from one chamber to the other. The bore 52 of the forward end 42 of the shaft 40 extends to a point within the end wall 22 and is there connected by suitable fittings 53 to a burner 54 provided with a vaporizing coil 55 and mounted upon the shaft 40 so as to rotate therewith. The bore 56 of the rearward end 43 of the shaft 40 extends to a point adjacent the baffle 47 and communicates with the rearward chamber 49 through perforations 56a in the shaft wall adjacent the partition 47.

A plurality of supporting members 57, which may suitably be rigid bars of square cross-section and are shown in the drawings as six in number, are disposed around the shaft 40 with their ends secured to recessed supporting plates 41 attached to shaft 40. The baffle or partition 47 is cut away as at 58 to permit extension of the bars 57 therethrough. Each of the supporting bars 57 carries a plurality of blades 59 set angularly thereon and curved at their outer edges so as to cause such edges to lie on a surface of revolutions which would define a cylinder coaxial with the shaft 40 and having a diameter approximately that of the baffle 47. The blades 59 with their supporting bars 57, shaft 40, and baffle 47, form a beater 60 rotatable in the cylinder 17 on the bearings 39, and divided by the baffle 47 into forward and rearward sections, with the blades 59 angularly disposed to form a screw-conveyor adapted to propel materials which they encounter in the cylinder outwardly and rearwardly when the shaft is rotated in its normal direction of rotation (counter-clockwise in Fig. 5).

Figure 5:
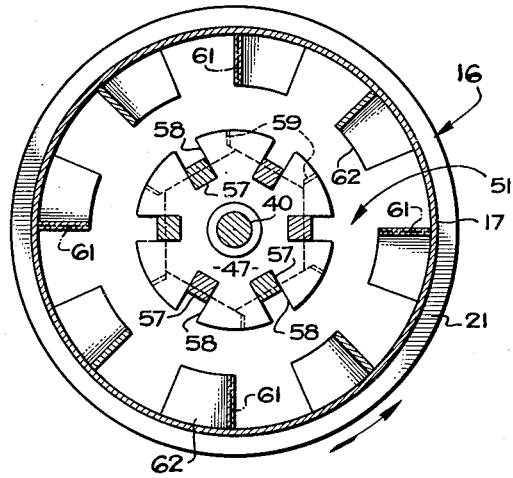
Fig. 5 is a vertical cross-section as viewed on line 5—5 of Fig. 4.

The cylinder 17 carries internally and longitudinally a plurality of paddles 61, shown as four in number, and standing radially from the cylinder wall, so as to lift materials and to dump them toward the center of the cylinder as the cylinder rotates in the direction of the arrow in Fig. 5. Adjacent the baffle 47, each of the paddles 61 is discontinuous in the plane of its principal axis to permit inclusion of a short advancing paddle 62, angularly disposed so as to have its leading face inclined rearwardly and adapted to push materials rearwardly past the baffle 47. The advancing paddles 62 are preferably angulated with respect to the forward portions of the paddles 61 and have their proximal edges forwardly of the baffle 47 and their distal edges rearwardly thereof, and may conveniently be greater in number than the paddles 61. In Fig. 5 I have shown the paddles 62 as eight in number, with the location of the paddles 61 shown in heavy dot-dash lines.

To drive the mixing plant, the engine 11 is connected through a reduction gear drive 63 to a shaft 64 upon which are two sprockets 65 and 66. The sprocket 65 operates through a chain 67 and sprocket 68 to drive a jack-shaft 69 extending forwardly and parallel to shaft 64. The sprocket 66 operates through a chain 7 to drive the sprocket 46 and the shaft 40 of the beater 60. The jack-shaft 69 is supported in bearings 71 and has mounted on it a sprocket 72 and a bevel gear 73. The sprocket 72 operates through a chain 74 and a sprocket 75 set circumferentially on the cylinder 17 to turn the cylinder. It will be seen from the arrows in Figs. 2, 3 and 5, indicating rotational direction, that the cylinder 17 and beater 60 are rotated in the same direction but the sprocket sizes are selected to cause the beater to rotate at approximately ten revolutions to one revolution of the cylinder. The bevel gear 73 meshes with a similar gear 76 to turn a cross-shaft 77 mounted transversely of the frame 14 in brackets 78, and thence through a sprocket 79 and chain 80 to turn the shaft 35 of the crusher 32.

In the operation of my invention, the vehicle 7 is drawn or propelled along a roadway with the inner frame 14 adjusted in height and inclination by the hydraulic cylinders 12 and 13 so that the scoop 26 may gather fragmented road-surfacing materials or similar friable aggregate as may be laid in windrows. The mounting of the inner frame 14 within the main frame 8 through the agency of the cylinders 12 and 13 permits the desired elevation of the scoop 26 with respect to the roadway surface, as well as the desired inclination thereof, to conform to the transverse inclination or slope of the roadway surface. The action of the independent cylinders 12 and the interconnected cylinders 13 will be apparent, but it will be observed that some form of stabilizing means is desirable in order that the frame 14 may be preserved in general location within the frame 8 at all adjusted positions. To this end, I may provide a pair of stabilizing rollers at each end of the frame 14, each coacting with a stabilizing guide 90 on the frame 8. The stabilizing rollers at each end of the frame 14 may comprise (with reference more particularly to Figs. 7 and 8 of the drawings) a roller 91 adapted to rotate about a longitudinally extending axis and an adjacent roller 92 adapted to rotate about a transversely extending axis, both rollers being disposed within a channel 93 formed by the guide 90. The diameter of the roller 91 is preferably such that the roller will fit between the side flanges 93a of the channel 93, and the rollers 92 are so shaped and disposed as to bear oppositely against the web portion 93b of the channel 93. The rollers 91 thus take the lateral thrust and the rollers 92 take the longitudinal thrust. The guides 90 may be secured to suitable cross-members on the frame 8, such as shown at 94.

The materials gathered are delivered by the scoop to the crusher 32 and there further crushed and fragmented between the rotating teeth 37 and the fixed teeth 34, and then thrown by the rotation of the teeth 37 through the passage 33 and opening 24 into the tumbler barrel 16. Rotation of the cylinder 17 causes the paddles 61 to lift the materials and to dump them upon the blades 59 of the beater 60, which, as they rotate in the same direction as the paddles, will catch the falling materials and throw them outwardly toward the cylinder wall, and rearwardly, as well as impacting and beating the material which they encounter in the lower part of the cylinder. The beater thus disintegrates and mixes the materials to a greater extent than could be obtained with the crusher alone. In this stage, while the materials are still in the forward chamber 48, as defined by the baffle 47, they may be heated and softened by a flame from the burner 55, fed by fuel which enters through the stuffing box 44 and the tubular shaft end 42. As the annular space 51 will be largely occupied by material thrown thereinto by the rapidly rotating beater blades, the flame will be largely confined to the interior of the beater in the space bounded by the supporting bars 57 and blades 59, and will be prevented by the baffle 47 from directly entering the rearward chamber 49. Fumes from the chamber 49 may be discharged through stack or chimney 95, which may communicate with chamber 49 through the wall 23.

The materials are moved rearwardly by the angularity of the blades 59 to the vicinity of the baffle 47 where their movement is accelerated and they are propelled beyond the baffle into the rearward chamber 49 by the inclined portions 62 of the paddles 61. Movement of material through the chamber 49 is maintained by the beater blades 59 to the end opening 25, whence they are discharged upon the roadway again, the blades and the paddles 61 cooperating as in the forward chamber to toss, disintegrate and mix the materials thoroughly. If it is desired to mix asphalt, road-oils, or water with the materials, such liquids may be introduced through the stuffing box 45, the shaft bore 56 and the perforations 56a. Because of the baffle 47, the operations of heating with a flame in the forward chamber 48 and mixing with a liquid in the rearward chamber 49 may be carried on simultaneously.

Numerous modifications may be made in the mechanical arrangements of the present invention without departing from the spirit and scope thereof; hence I do not choose to be limited to the above-described example but rather to the scope of the appended claims.

I claim:

1. A mixing plant for treating and re-conditioning road-surfacing aggregates and like materials, comprising: a barrel having its principal axis substantially horizontal, and having fixed end walls and a cylinder rotatably mounted therebetween, one of said end walls being formed and positioned to define an opening for the entry of materials into said barrel and the other of said end walls being formed and positioned to define a discharge opening from said barrel in its lower segment; means for rotating said cylinder; a shaft extending between said end walls and rotatably mounted thereon, said shaft having tubular ends terminating externally of said barrel; a baffle carried by said shaft dividing said barrel into a first chamber adjacent said entry opening and a second chamber adjacent said discharge opening, and defining a passage between said chambers; means for rotating said shaft in the same direction as said cylinder but at a higher rotational speed; a crusher adjacent said entry opening having a set of spaced fixed teeth and adapted to propel materials through said entry opening into said barrel; a plurality of paddles on the inner side of said cylinder disposed radially and longitudinally therein; additional paddles on the inner side of said cylinder angularly inclined to the principal axes of said first mentioned paddles and having their leading faces inclined rearwardly and extending from said first chamber into said second chamber, whereby said additional paddles are adapted to propel materials from said first chamber to said second chamber; a plurality of blades carried by said shaft at an angle to the axis thereof so as to form therewith a screw conveyor adapted to move materials rearwardly through said first chamber to said baffle and then through said second chamber to said discharge opening and to propel said materials outwardly toward said paddles; heating means carried by said shaft adjacent said entry opening and having fuel conducting connections with that one tubular end of said shaft adjacent thereto; a stuffing box on said one end of said shaft external of said barrel and adapted to receive a fuel supply line; a stuffing on the other tubular end of said shaft adapted to receive a liquid supply line; said other tubular end having perforations internally of said second chamber for the admission of liquid into said chamber adjacent said baffle.

2. A mixing plant for treating and re-conditioning road surfacing aggregates and like materials, comprising: a barrel having its principal axis substantially horizontal, and having fixed end walls and a cylinder rotatably mounted therebetween, one of said end walls being formed and positioned to define an opening for the entry of materials into said barrel and the other of said end walls being formed and positioned to define a discharge opening from said barrel in its lower segment; means for rotating said cylinder; a shaft extending between said end walls and rotatably mounted thereon, said shaft having tubular ends terminating externally of said barrel; means dividing said barrel into a first chamber adjacent said entry opening and a second chamber adjacent said discharge opening, and defining a passage between said chambers; means for rotating said shaft in the same direction as said cylinder but at a higher rotational speed; a crusher adjacent said entry opening having a set of spaced fixed teeth and adapted to propel materials through said entry opening into said barrel; a plurality of paddles on the inner side of said cylinder disposed radially and longitudinally therein; additional paddles on the inner side of said cylinder angularly inclined to the principal axes of said first mentioned paddles and having their leading faces inclined rearwardly and extending from said first chamber into said second chamber, whereby said additional paddles are adapted to propel materials from said first chamber to said second chamber; a plurality of blades carried by said shaft at an angle to the axis thereof so as to form therewith a screw conveyor adapted to move materials rearwardly through said first chamber to said dividing means and then through said second chamber to said discharge opening and to propel said materials outwardly toward said paddles; a heater carried by said shaft adjacent said entry opening and having fuel conducting connections with that one tubular end of said shaft adjacent thereto; a stuffing box on said one end of said shaft external of said barrel and adapted to receive a fuel supply line; a stuffing on the other tubular end of said shaft adapted to receive a liquid supply line; said other tubular end having perforations internally of said second chamber for the admission of liquid into said chamber.

3. A mixing plant for treating and re-conditioning road surfacing aggregates and like materials, comprising: a barrel having its principal axis substantially horizontal, and having fixed end walls and a cylinder rotatably mounted therebetween, one of said end walls being formed and positioned to define an opening for the entry of materials into said barrel and the other of said end walls being formed and positioned to define a discharge opening from said barrel in its lower segment; means for rotating said cylinder; a shaft extending between said end walls and rotatably mounted thereon; wall means within the cylinder intermediate said end walls dividing said barrel into a first chamber adjacent said entry opening and a second chamber adjacent said discharge opening, and defining a passage between said chambers; means for rotating said shaft in the same direction as said cylinder but at a higher rotational speed; a plurality of paddles on the inner side of said cylinder disposed radially and longitudinally therein; additional paddles on the inner side of said cylinder angularly inclined to the principal axes of said first mentioned paddles and having their leading faces inclined rearwardly and extending from said first chamber into said second chamber, whereby said additional paddles are adapted to propel materials from said first chamber to said second chamber; and a plurality of blades carried by said shaft at an angle to the axis thereof so as to form therewith a screw conveyor adapted to move materials rearwardly through said first chamber to said dividing means and then through said second chamber to said discharge opening and to propel said materials outwardly toward said paddles.

4. A mixing plant for treating and re-conditioning road surfacing aggregates and like materials, comprising: a barrel having its principal axis substantially horizontal, and having fixed end walls and a cylinder rotatably mounted therebetween, one of said end walls being formed and positioned to define an opening for the entry of materials into said barrel and the other of said end walls being formed and positioned to define a discharge opening from said barrel in its lower segment; means for rotating said cylinder; a shaft extending between said end walls and rotatably mounted thereon; a baffle carried by said shaft at a position intermediate said end walls dividing said barrel into a first chamber adjacent said entry opening and a second chamber adjacent said discharge opening, and defining a passage between said chambers; means for rotating said shaft; a plurality of paddles on the inner side of said cylinder disposed radially and longitudinally therein; additional paddles on the inner side of said cylinder angularly inclined to the principal axis of said first mentioned paddles and having their leading faces inclined rearwardly and positioned to extend from said first chamber into said second chamber, whereby said additional paddles are adapted to propel materials from said first chamber to said second chamber; and a plurality of blades carried by said shaft at an angle to the axis thereof so as to form therewith a screw conveyor adapted to move materials rearwardly through said first chamber to said baffle and then through said second chamber to said discharge opening and to propel said materials outwardly toward said paddles.

5. A mixing plant for treating and re-conditioning road surfacing aggregates and like materials, comprising: a barrel having its principal axis substantially horizontal, and having fixed end walls and a cylinder rotatably mounted therebetween, one of said end walls being formed and positioned to define an opening for the entry of materials into said barrel and the other of said end walls being formed and positioned to define a discharge opening from said barrel in its lower segment; means for rotating said cylinder; a shaft extending between said end walls and rotatably mounted thereon; means dividing said barrel into a first chamber adjacent said entry opening and a second chamber adjacent said discharge opening, and defining a passage between said chambers; means for rotating said shaft in the same direction as said cylinder but at a higher rotational speed; a crusher adjacent said entry opening having a set of spaced fixed teeth and adapted to propel materials through said entry opening into said barrel; means attached to said cylinder for moving said materials inwardly toward the axis of said cylinder and longitudinally from said first chamber to said second chamber; a plurality of blades carried by said shaft at an angle to the axis thereof so as to form therewith a screw conveyor adapted to move materials rearwardly through said first chamber to said dividing means and then through said second chamber to said discharge opening and to propel said materials outwardly; a heater carried by said shaft adjacent said entry opening and having fuel conducting connections with that one tubular end of said shaft adjacent thereto; a stuffing box on said one end of said shaft external of said barrel and adapted to receive a fuel supply line; a stuffing on the other tubular end of said shaft adapted to receive a liquid supply line; said other tubular end having perforations internally of said second chamber for the admission of liquid into said chamber.

6. A mixing plant for treating and re-conditioning road-surfacing aggregates and like materials, comprising: a barrel having its principal axis substantially horizontal, and having fixed end walls and a cylinder rotatably mounted therebetween, one of said end walls being formed and positioned to define an opening for the entry of materials into said barrel and the other of said end walls being formed and positioned to define a discharge opening from said barrel in its lower segment; means for rotating said cylinder; a shaft extending between said end walls and rotatably mounted thereon, said shaft having tubular ends terminating externally of said barrel; a baffle carried by said shaft dividing said barrel into a first chamber adjacent said entry opening and a second chamber adjacent said discharge opening, and defining a passage between said chambers; means for rotating said shaft in the same direction as said cylinder but at a higher rotational speed; a plurality of paddles on the inner side of said cylinder disposed radially and longitudinally therein; additional paddles on the inner side of said cylinder angularly inclined to the principal axes of said first mentioned paddles and having their leading faces inclined rearwardly and extending from said first chamber into said second chamber, whereby said additional paddles are adapted to propel materials from said first chamber to said second chamber; a plurality of blades carried by said shaft at an angle to the axis thereof so as to form therewith a screw conveyor adapted to move materials rearwardly through said first chamber to said baffle and then through said second chamber to said discharge opening and to propel said materials outwardly toward said paddles; a heater carried by said shaft adjacent said entry opening and having fuel-conducting connections with that one tubular end of said shaft adjacent thereto; a stuffing box on said one end of said shaft external of said barrel and adapted to receive a fuel supply line; a stuffing on the other tubular end of said shaft adapted to receive a liquid supply line; said other tubular end having perforations internally of said second chamber for the admission of liquid into said chamber.

7. In a vehicular mixing plant of the character described the combination of: a barrel having fixed end walls and a cylinder rotatably mounted therebetween, one of said end walls defining an opening for the entry of materials into said barrel and the other of said end walls defining a discharge opening from said barrel in its lower segment; means for rotating said cylinder; a shaft extending between said end walls and rotatably mounted thereon; wall means within the cylinder intermediate said end walls dividing said barrel into a first chamber adjacent said entry opening and a second chamber adjacent said discharge opening; a scoop communicating with said entry opening; crusher means adjacent said entry opening and cooperating with said scoop to crush friable materials such as broken road surfacing and the like and to move said materials when crushed into said first chamber through said entry opening; means mounted on said shaft and within said barrel for further disintegrating said materials and for moving said materials from said first chamber to said second chamber and from said second chamber to said discharge opening; means for heating said materials while in said first chamber; and means including a conduit within said shaft for introducing liquid into said second chamber.

8. In a vehicular mixing plant of the character described having a vehicular frame and wheel means supporting the frame for travel along a road, the combination comprising: a cylinder rotatably mounted on the frame; a pair of spaced fixed end walls located one at each end of the cylinder, one of said end walls cooperating with the cylinder to define an opening for the entry of materials into said barrel and the other of said end walls cooperating with the cylinder to define a discharge opening from the cylinder in its lower segment; material delivery means communicating with the entry opening to deliver materials to the interior of the cylinder from the road surface; material disintegrating means supported between the end walls and within the cylinder for disintegrating road material and for moving said materials to the discharge opening from the entry opening; wall means within the cylinder intermediate the fixed end walls dividing the interior of the cylinder into a first space adjacent the entry opening and a second space adjacent the discharge opening, and defining a passage between the first and second spaces; heating means in the first space for heating the materials while therein; and conduit means for introducing a liquid into second space for admixing with materials therein.

9. A vehicular mixing plant as in claim 8, comprising in addition: a shaft rotatably mounted on and extending between the fixed end walls of the mixing and disintegrating chamber, said disintegrating means and said wall means being mounted upon said shaft.

10. A vehicular mixing plant as in claim 8, comprising in addition: a shaft rotatably mounted on and between the fixed end walls and projecting beyond each of said end walls; means including a passage in the shaft at the entry end of the cylinder to supply liquid fuel to the heating means; and another passage in the shaft at the discharge end of the cylinder forming part of the means for introducing liquid for admixing with the materials.

11. A vehicular mixing plant as in claim 8 in which the material delivery means comprises: a transverse shaft rotatably mounted on the frame outside of and adjacent the entry opening of the cylinder; arms carried by the shaft for striking and throwing materials into the cylinder through the entry opening; and scoop means carried by the frame for picking up materials from the road surface and delivering them into the path of the arms on the transverse shaft.

12. In a vehicular mixing plant of the character described having a vehicular frame and wheel means supporting the frame for travel along a road, the combination comprising: a cylinder rotatably mounted on the frame; a pair of spaced fixed end walls located one at each end of the cylinder, one of said end walls cooperating with the cylinder to define an opening for the entry of materials into said barrel and the other of said end walls cooperating with the cylinder to define a discharge opening from the cylinder in its lower segment; a scoop mounted on the frame communicating at one end with the delivery opening and extending down toward the road surface to pick up road materials; and materials disintegrating means adjacent the entry opening and cooperating with the scoop to break up friable materials and throw them through the entry opening, said disintegrating means comprising a rotatable shaft mounted on the frame and carrying spaced teeth that strike and move the materials, and spaced fixed teeth on the scoop positioned between the teeth on the rotating shaft and cooperating therewith to break up the materials.

13. In a vehicular mixing plant of the character described having a vehicular frame and wheel means supporting the frame for travel along a road, the combination comprising: a cylinder rotatably mounted on the frame with its axis parallel to the direction of travel of the frame, said cylinder having an entry opening at one end; a shaft rotatably mounted on the frame outside the cylinder with its axis transverse to the axis of the cylinder and at a position adjacent the entry opening; a plurality of rigid, radial arms on the transverse shaft at axially spaced positions; imperforate scoop means for picking up broken road surfacing materials from the road surface by virtue of forward travel of the frame and delivering them into the path of said radial arms; drive means for rotating the shaft and arms at a relatively high rotational speed compared with the rotational speed of the cylinder to strike pieces of broken road materials elevated above the road surface on the scoop means and throw them into the cylinder through the entry opening; and disintegrating means inside the cylinder for further disintegrating and mixing said materials and moving them through the cylinder away from the entry opening.

PAUL R. McEACHRAN.

REFERENCES CITED

The following references are of record in the file of this patent:

UNITED STATES PATENTS

| Number | Name | Date |
| --- | --- | --- |
| 1,062,113 | Popkess | May 20, 1913 |
| 1,205,948 | Popkess | Nov. 21, 1916 |
| 1,997,959 | Wood | Apr. 16, 1935 |
| 2,030,683 | Chamberlain | Feb. 11, 1936 |
| 2,114,078 | Jackson | Apr. 12, 1938 |
| 2,368,331 | Seaman | Jan. 30, 1945 |
| 2,397,782 | Flynn | Apr. 2, 1946 |